(12) United States Patent  
O'Callaghan (10) Patent No.: US 7,530,729 B2
(45) Date of Patent: May 12, 2009

(54) BLENDERS

(75) Inventor: James Joseph O'Callaghan, Dundalk (IE)

(73) Assignee: Vervant Limited, Dublin (IE)

( * ) Notice: Subject to any disclaimer, the term of this patent is extended or adjusted under 35 U.S.C. 154(b) by 106 days.

(21) Appl. No.: 11/826,836

(22) Filed: Jul. 18, 2007

(65) Prior Publication Data

US 2008/0049546 A1 Feb. 28, 2008

Related U.S. Application Data (63) Continuation of application No. 10/971,697, filed on Oct. 25, 2004, now abandoned, which is a continuation of application No. 10/265,120, filed on Oct. 7, 2002, now abandoned.

(30) Foreign Application Priority Data

Oct. 5, 2001 (IE) ............................... S2001/0881

(51) Int. Cl.
*B01F 15/02* (2006.01)
*G01D 13/02* (2006.01)
*B65B 1/30* (2006.01)

(52) U.S. Cl. .................... 366/132; 366/141; 366/163.1; 366/163.2; 222/55; 222/56; 222/77; 141/83

(58) Field of Classification Search ................. 366/132, 366/101, 107, 163.1, 163.2, 141; 177/116; 141/83; 222/55, 56, 57
See application file for complete search history.

(56) References Cited

U.S. PATENT DOCUMENTS

| | | | | |
|---|---|---|---|---|
| 3,197,261 A | * | 7/1965 | Kauffman | 406/124 |
| 3,797,890 A | * | 3/1974 | Walters | 141/83 |
| 4,591,012 A | * | 5/1986 | Moran et al. | 177/145 |
| 5,478,172 A | * | 12/1995 | Oura et al. | 406/23 |
| 6,719,500 B2 | * | 4/2004 | Pfeiffer et al. | 406/91 |
| 6,823,904 B2 | * | 11/2004 | Finke et al. | 141/83 |

* cited by examiner

*Primary Examiner*—Tony G Soohoo
(74) *Attorney, Agent, or Firm*—Birch, Stewart, Kolasch & Birch, LLP (57) ABSTRACT

A material transfer device, in particular for use with blenders associated with a material processing device such as a plastics extruding device. The material transfer device can be used for controlling delivery of measured amounts of particulate material to or from a weigh hopper, or for mixing materials in a mixing chamber of the blender. The material transfer device includes a pipe defining a material delivery path. The pipe has a material inlet and a material outlet. An air inlet manifold encircling the pipe is connected by an air supply line to a pressurized air supply. Air outlets of the manifold direct an air stream towards the outlet of the pipe to draw material through the pipe from a hopper of particulate material, the pipe inlet being located within the hopper. An air inlet valve in the air supply line is connected to a controller which is operable to open and shut the valve for pulsing the gas stream to control the amount of material delivered through the pipe.

14 Claims, 9 Drawing Sheets

BLENDERS

This application is a continuation of U.S. patent application Ser. No. 10/971,697 filed Oct. 25, 2004, now abandoned, which is a continuation of U.S. patent application Ser. No. 10/265,120 filed Oct. 7, 2002, now abandoned, which claims priority under 35 USC 119 from Irish Patent Application No. US 2001/01881 filed Oct. 5, 2001, all three applications being incorporated herein by reference.

This invention relates to blenders and to a material transfer device for use with blenders and in other devices and applications.

In a first aspect the invention relates to a system and apparatus for transferring materials, and in particular fluid materials such as particulate material, powders or liquids.

According to the invention there is provided a material transfer device including a pipe or passageway defining a material delivery path, the pipe having a material inlet and a discharge outlet, means for delivering a gas stream along the material delivery path directed towards the outlet, characterised in that there is provided means for controlling the gas stream, said control means being operable for pulsing the gas stream. The gas will usually be air, however, other gases may be used if required for particular applications.

In a particularly preferred embodiment the means for controlling the gas stream is a gas inlet valve connected to a controller which is operable to open and shut the valve for desired time periods.

In another embodiment the gas control means includes means for regulating the pressure of the gas. Conveniently said means may comprise a pressure regulator mounted upstream of the gas inlet valve.

In an alternative arrangement the gas control means includes means for regulating gas flow. If desired, the gas control means is operable for regulation for both gas pressure and gas flow.

In a particularly preferred embodiment the gas stream is an annular gas stream.

In a preferred embodiment the means for delivering an annular gas stream into the pipe comprises a gas inlet manifold extending about the pipe having an inlet for connection to a pressurised gas supply and an outlet communicating with the material delivery path. Preferably the outlet includes a number of circumferentially spaced-apart outlet openings extending through the pipe and arranged to direct gas towards the outlet of the pipe.

In a further embodiment the outlet of the means for delivering the annular gas stream into the pipe is located intermediate the ends of the pipe for delivering the gas stream into the pipe directed towards the outlet of the pipe.

In another embodiment, the means for delivering a gas stream along the material delivery path has a gas outlet angled relative to the pipe to direct a gas stream into the pipe towards the outlet of the pipe. The gas outlet may be angled at 45° to the material delivery path or central longitudinal axis of the pipe.

In an further embodiment a material pick-up line connects into the pipe intermediate the inlet and the outlet of the pipe, an outlet of the pick-up line opening into the pipe, means for connecting the inlet of the pipe to a pressurised gas supply source, in use delivery of a gas stream along the pipe generating a vacuum in the pick-up line to suck up materials through the pick-up line for delivery through the pipe and discharge at the outlet of the pipe.

In another aspect the invention provides a material transfer device as described above in combination with a weighing device with either the inlet or the outlet of the pipe being connected to an outlet or an inlet respectively of the weighing device. Thus advantageously this allows control of the filling or discharge of material from the weigher.

In a further aspect the invention provides a mixing device including a material transfer device and an associated mixing chamber, the material transfer device including a pipe defining a material delivery path, the pipe having a material inlet and a material discharge outlet, means for delivering a gas stream along the material delivery path directed towards the outlet to deliver material between the inlet and the outlet, the outlet of the pipe being located adjacent and spaced-apart from a deflector baffle of the mixing chamber for scattering material discharged from the pipe within the mixing chamber.

In another embodiment the invention provides a mixing device including a mixing chamber with the material transfer device having an inlet of the pipe located adjacent a bottom of the mixing chamber and an outlet of the pipe located above the inlet for directing material from the pipe outlet against a deflector baffle for discharge into the mixing chamber. Conveniently the material transfer device may be mounted on a sidewall of the mixing chamber. Two material transfer devices may be provided mounted on opposite side walls of the mixing chamber.

In a further embodiment, the material transfer device is located within the mixing chamber. Preferably the pipe of the material transfer device is mounted centrally in an upright orientation within the mixing chamber. Conveniently the deflector baffle is of arcuate shape for deflecting material discharged from the outlet of the pipe outwardly and downwardly towards the inlet of the pipe. Thus the material can be delivered in a circulatory motion within the mixing chamber for mixing of the materials.

In another aspect the invention provides a blending apparatus for mixing particulate materials prior to discharge into a process line incorporating the mixing device as described herein, the blending apparatus including a mixing chamber, mixing means for mixing additive materials within the mixing chamber, said mixing means comprising the material transfer device having an inlet of the material transfer device communicating with a bottom of the mixing chamber and the outlet of the material transfer device communicating with the top of the mixing chamber.

In another embodiment the invention provides a blending apparatus, including:
  a mixing chamber, the mixing chamber having an inlet for reception of a batch of additive materials to be mixed and a blended material outlet,
  a lower portion of the mixing chamber tapering inwardly and downwardly towards a bottom of the mixing chamber which forms a trough,
  the blended material outlet being located in the trough at the bottom of the mixing chamber,
  mixing means for mixing materials in the mixing chamber,
  a level sensor mounted within the mixing chamber, the level sensor being connected to a controller which is operable to regulate the supply of fresh materials to the mixing chamber for mixing, said controller being operable to deliver a batch of additive materials into the mixing chamber when the level of material within the mixing chamber drops to the level sensor,
  the mixing means comprising at least one material transfer device mounted on a side wall of the mixing chamber having the inlet of the material transfer device communicating with the bottom of the mixing chamber and the outlet of the material transfer device communicating with a top of the mixing chamber.

In another embodiment the blending apparatus further includes a weigh hopper having an outlet arranged to discharge material from the weigh hopper to the mixing chamber, at least one raw material supply bin, a material transfer device mounted at an outlet of the material supply bin being operatively connected to a controller to regulate discharge of material from the bin to the weigh hopper or the mixing chamber.

In another embodiment the invention provides a blending apparatus incorporating the material transfer device, said blending apparatus for controlled deliver of blend additives to a material processing device and including a primary additive feed hopper and at least one secondary additive feed hopper communicating with an additives discharge chute having an upper inlet end and a lower outlet end for connection to an additive inlet of the material processing device, the or each secondary additive feed hopper having an associated feeding means for delivery of material from the secondary additive feed hopper to the additives discharge chute, said feeding means comprising the material transfer device, an inlet of the material transfer device being connected to the secondary additive feed hopper and the outlet of the material transfer device communicating with an interior of the additives discharge chute.

In another embodiment the invention provides a blending apparatus for controlled delivery of blend additives to a material processing device, including:
a primary additive feed hopper,
at least one secondary additive feed hopper,
an additive discharge chute having an outlet for connection to the material processing device,
the primary additive feed hopper being mounted above the additive discharge chute for continuous gravity feed of additive material thereto,
a secondary feeding means being connected between each secondary feed hopper and the additives discharge chute for delivery of feed additive from the secondary feed hopper to the additives discharge chute,
means for sensing the throughput of material in the material processing device,
means for sensing the discharge of additives from the feed hoppers,
a controller adapted to be connected to the means for sensing the throughput of the material processing device and to the means for sensing the discharge of additives from the feed hoppers,
the controller including means for regulating the throughput of material through the material processing device in response to the sensed discharge of material from the feed hoppers, the secondary feeding means comprising a material transfer device, an inlet of the material transfer device being connected to the secondary additive feed hopper and the outlet of the material transfer device communicating with an interior of the additives discharge chute.

In another embodiment a material sprinkling device may be formed by mounting means for spraying or scattering the material at or adjacent the outlet of the pipe.

In a further aspect of the invention there is provided a material transfer system using the material transfer device as previously described, the system including the step of controlling the gas stream for delivering a preset desired quantity of material through the pipe.

In another embodiment the system includes pulsing the gas stream for delivering the desired quantity of material through the pipe in one or more discrete amounts.

In a further embodiment the system includes the step of delivering the material to a weighing device, the outlet of the pipe being connected to an inlet of the weighing device, the material transfer device and weighing device being connected to a controller, controlling the gas stream in response to the sensed weight of material in the weighing device.

In another embodiment the system includes the step of discharging the material from the weighing device which is connected to an inlet of the pipe, the material transfer device and weighing device being connected to a controller, controlling the gas stream in response to the sensed weight of material discharged from the weighing device.

In a further aspect of the invention there is provided a high temperature blender in which a material handling apparatus is mounted within a sealed housing of double wall construction. Such a blender is useful for handling hygroscopic materials which may, for example, be heated to a temperature in the order of 200° C. to exclude moisture. The double wall construction of the housing has both an insulation benefit and also a safety benefit in that the high temperature surfaces of the inner wall are not exposed to the touch.

In a preferred embodiment, the material handling apparatus includes a weigh hopper suspended within the housing on an expandable mounting bracket comprising a pair of mutually sliding and overlapping arms each having an outer end attached to a load cell which is mounted outside the housing and a free inner end, each arm having a hanger to support one side of the weigh hopper. Advantageously, by mounting the load cells on an exterior of the housing, they are thermally insulated. Also, the fact that the arms of the mounting bracket are expandable prevents inaccuracies in the load cell measurements due to the heat.

In another embodiment, the material handling apparatus includes a weigh hopper and an associated mixing chamber mounted below the weigh hopper for reception of material from the weigh hopper, and means for mixing material within the mixing chamber prior to discharge of mixed material through an outlet of the mixing chamber.

The invention will be more clearly understood by the following description of some embodiments thereof, given by way of example only, with reference to the accompanying drawings, in which.

Figure 1:
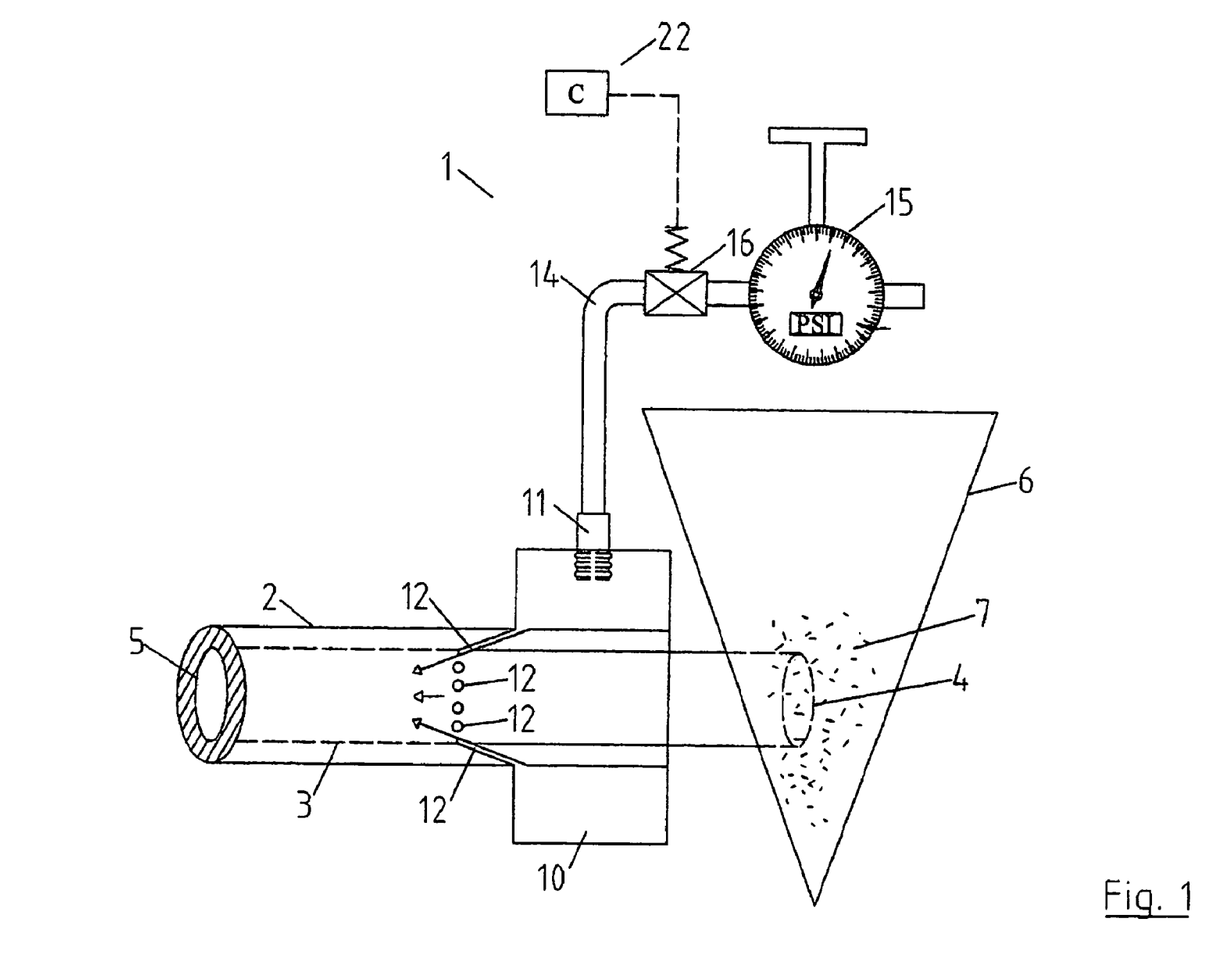
FIG. 1 is a schematic illustration of a material transfer device according to the invention.

Referring to the drawings, and initially to FIG. 1 thereof, there is illustrated a material transfer device according to the invention indicated generally by the reference numeral 1. The device 1 includes a pipe 2 a bore of which defines a material delivery path 3 having an inlet 4 and an outlet 5. In the drawing the inlet 4 is shown disposed within a reservoir or hopper 6 containing particulate material 7 for delivery through the pipe 2 of the device 1. A gas inlet manifold 10 extends about the pipe 2 and has an inlet 11 for connection to a pressurised gas supply which in many cases will be compressed air. An outlet of the manifold 10 is formed by a number of circumferentially spaced-apart outlet slots or openings 12 which extend through the side wall of the pipe 2 intermediate the ends of the pipe 2. As can be seen in the drawing the outlet openings 12 are angled relative to the material delivery path 3 or central longitudinal axis of the pipe 2 to direct a gas stream discharged from the openings 12 towards the outlet 5 of the pipe 2. A pressurised gas supply is delivered to the manifold 10 through a gas supply line 14. The pressurised gas is controlled by means of a regulator 15 which is operable to regulate the pressure of the gas supply and a gas inlet valve 16 which is connected to a controller 22 which is operable to open and shut the valve 16 for desired time periods. The valve 16 may conveniently be operated by a solenoid or the like to open and close as directed by the controller 22.

If desired also the regulator 15 may be connected to the controller 22 to allow regulation of the gas pressure by means of the controller 22.

In use, the inlet end 4 of the pipe 2 is connected to a material supply which is illustrated in the drawing as material 7 within the hopper 6. The gas supply line 14 is connected to a source of pressurised gas, typically compressed air. The desired pressure of the gas can be set by manipulation of the regulator 15. When the gas inlet valve 16 is open pressurised gas is delivered into the manifold 10 from where it is discharged through the outlet openings 12 to form an annular gas stream directed towards the outlet 5 of the pipe 2. This generates a vacuum in the pipe 2 upstream of the openings 12 which draws the material 7 from the hopper 6, the material 7 becoming entrained in the gas stream and discharged through the outlet 5 of the pipe 2.

It will be noted that the controller 22 for the gas inlet valve 16 is operable to open and shut the valve 16 for pulsing the gas stream. By controlling the pulses of the gas stream a desired quantity of material can be delivered through the pipe 2 in one or more discrete amounts.

The material transfer device can be used for example in a blending apparatus of the type described in our earlier European patent application no. 96650040.7 (EP 0761410), the contents of which are incorporated herein by reference. For example the device 1 may be used for controlling the filling of the feed hoppers of such a blending apparatus or for controlling the discharge of secondary additive material from the secondary additive feed hoppers of such a blending apparatus.

Figure 2:
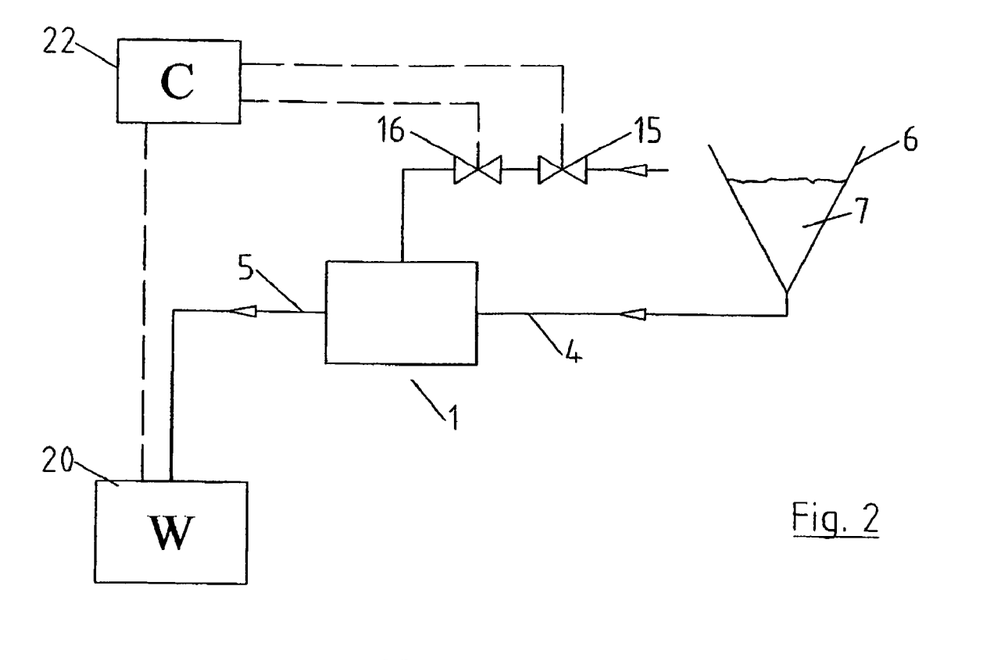
FIG. 2 is a schematic illustration of the material transfer device in use in a weighing system of the invention.

FIG. 2 shows the device 1 in combination with a weigh hopper 20 for feed additive material in such a blending apparatus. The inlet 4 of the device 1 is connected to a supply hopper 6 containing the granular material 7 to be supplied to the weigh hopper 20. The outlet 5 of the device 1 is connected to an inlet of the weigh hopper 20. Each of the gas regulator 15, gas inlet valve 16 and load cells of the weigh hopper 20 are connected to a controller 22. The controller 22 is operable to control pulsing of the pressurised gas supply to the device 1 in response to the sensed weight of material in the weigh hopper 20 to regulate delivery of material 7 from the hopper 6 into the weigh hopper 20.

Figure 3:
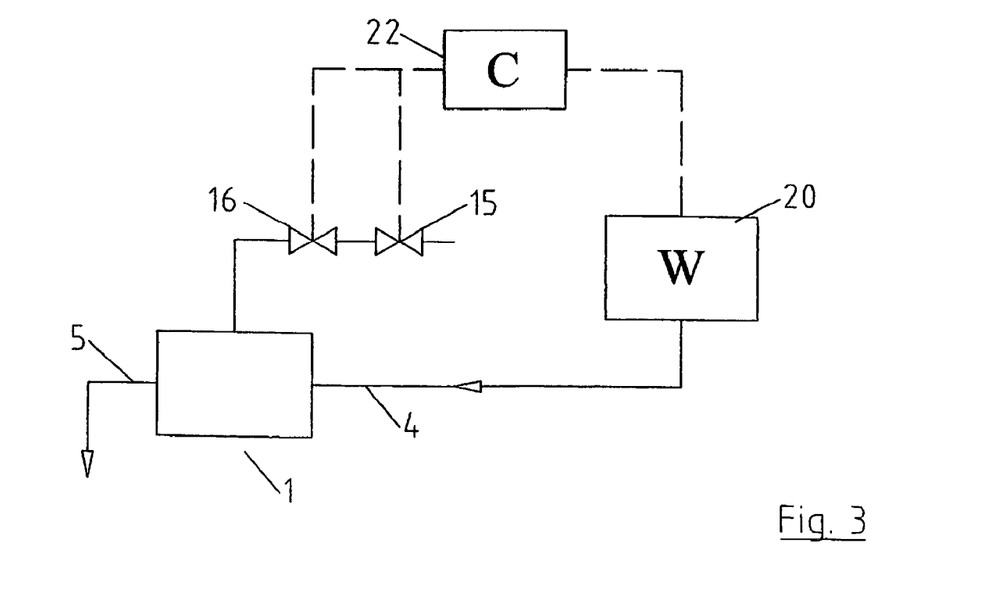
FIG. 3 is a schematic illustration of the material transfer device in use with another weighing system of the invention.

Referring now to FIG. 3 a system is shown incorporating the device 1 for regulating discharge of material from a weigh hopper 20 of a blending apparatus of the type previously mentioned. In this case the inlet 4 of the device 1 is connected to an outlet of the weigh hopper 20 and the outlet 5 of the device 1 directs a measured stream of material from the weigh hopper 20 into a processing line. The controller 22 is operable for pulsing the pressurised gas supply to the device 1 for regulating the supply of material from the weigh hopper 20 through the device 1 into the processing line.

Thus as described in the embodiments shown in FIGS. 2 and 3 the device 1 can be used for the controlled filling or discharge of material from a weigher.

Figure 4:
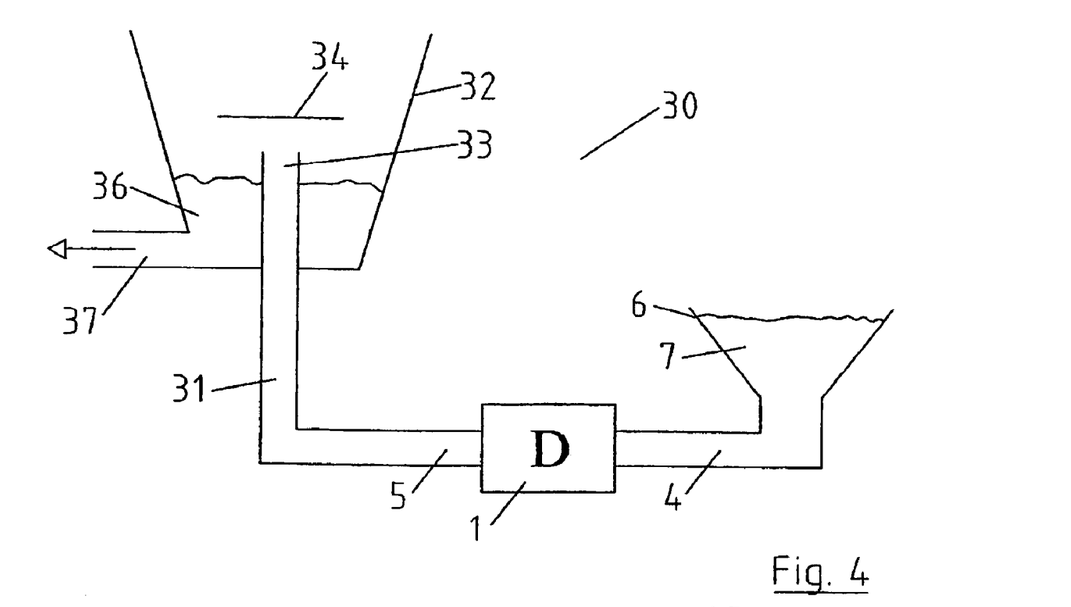
FIG. 4 is a schematic illustration of the material transfer device in use with a mixing device of the invention.

Referring now to FIG. 4 there is shown a mixing device incorporating the material transfer device 1, the mixing device being indicated generally by the reference numeral 30. Parts similar to those described previously are assigned the same reference numerals. In this case the inlet 4 of the device 1 is connected to a hopper 6 with a supply of material 7. The outlet 5 of the device delivers material through a discharge pipe 31 into a mixing chamber 32. An outlet end 33 of the discharge pipe 31 directs material against a baffle plate 34 spaced away from the outlet end 33 such that the material impinges against the baffle plate 34 and is scattered within the mixing chamber 32 for mixing the material. Mixed material 36 can then be discharged through an outlet 37 of the mixing chamber 32.

Figure 5:
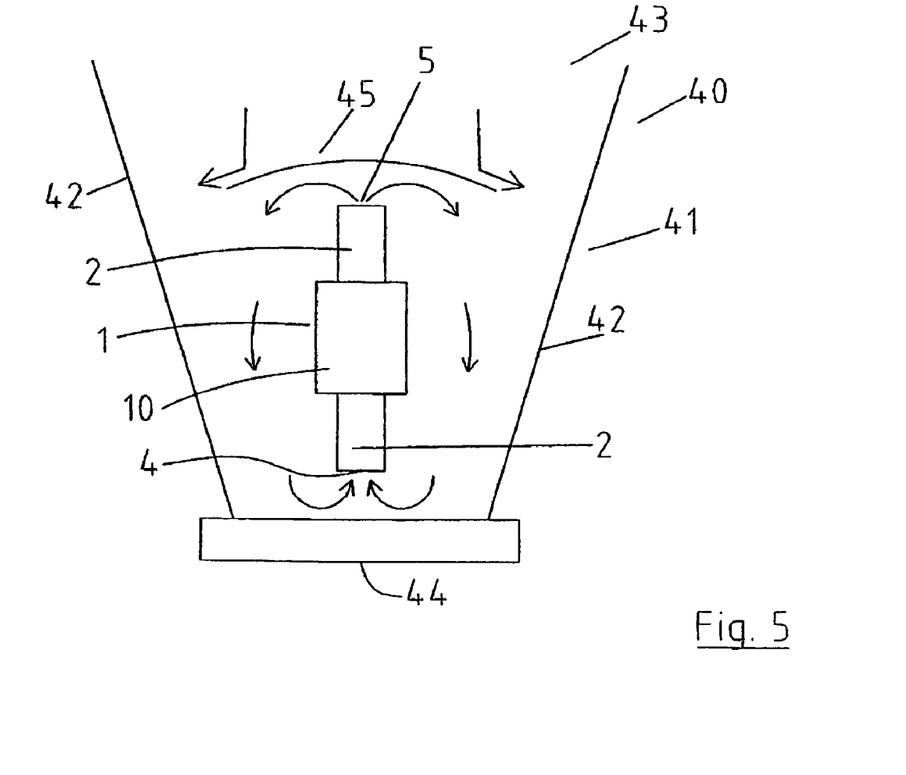
FIG. 5 is a schematic illustration of another mixing device incorporating the material transfer device.
Figure 6:
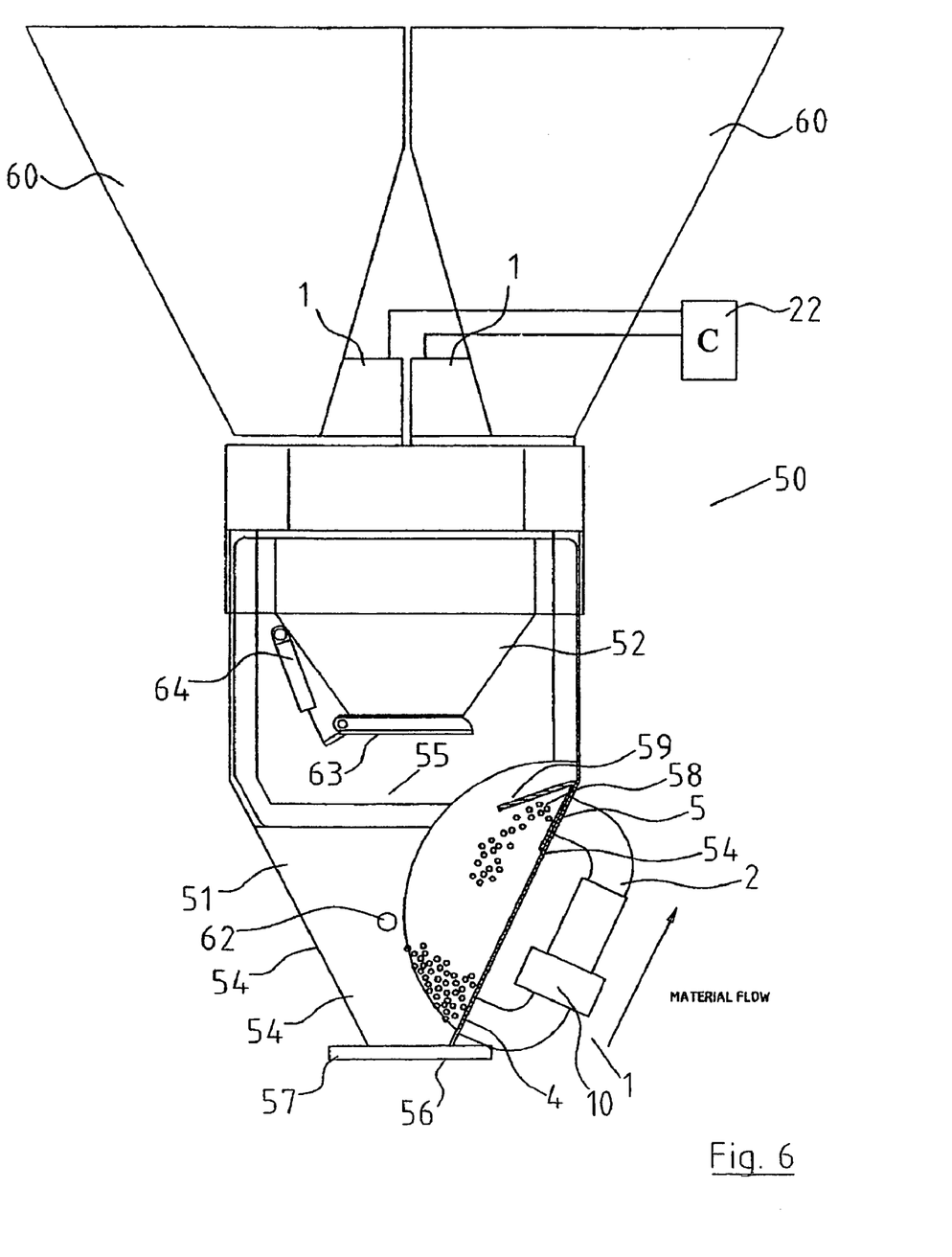
FIG. 6 is a partially cut-away elevational view of a blender incorporating the material transfer device.
Figure 7:
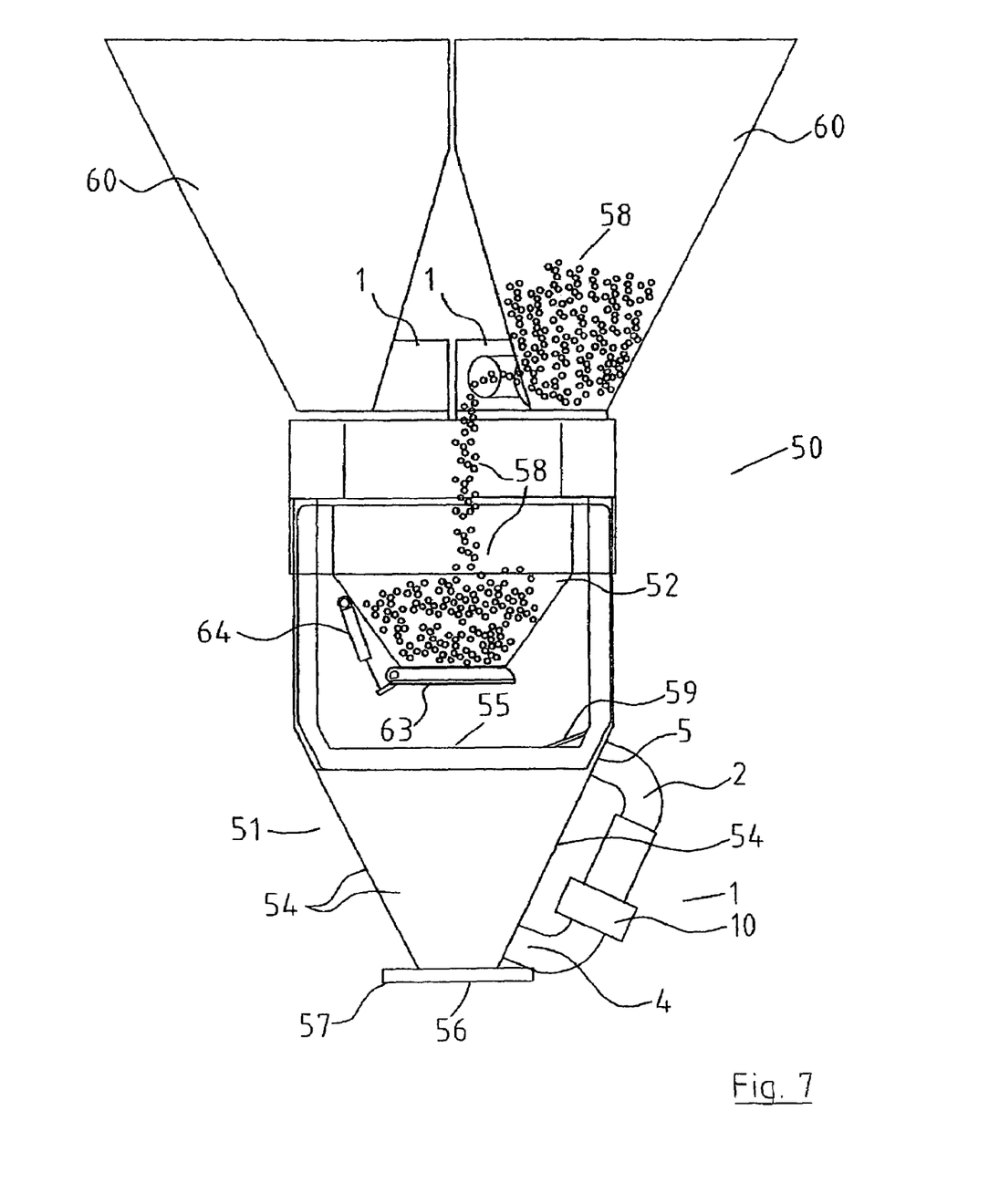
FIG. 7 is an elevational view of the blender of FIG. 6 showing material flow in the blender.
Figure 8:
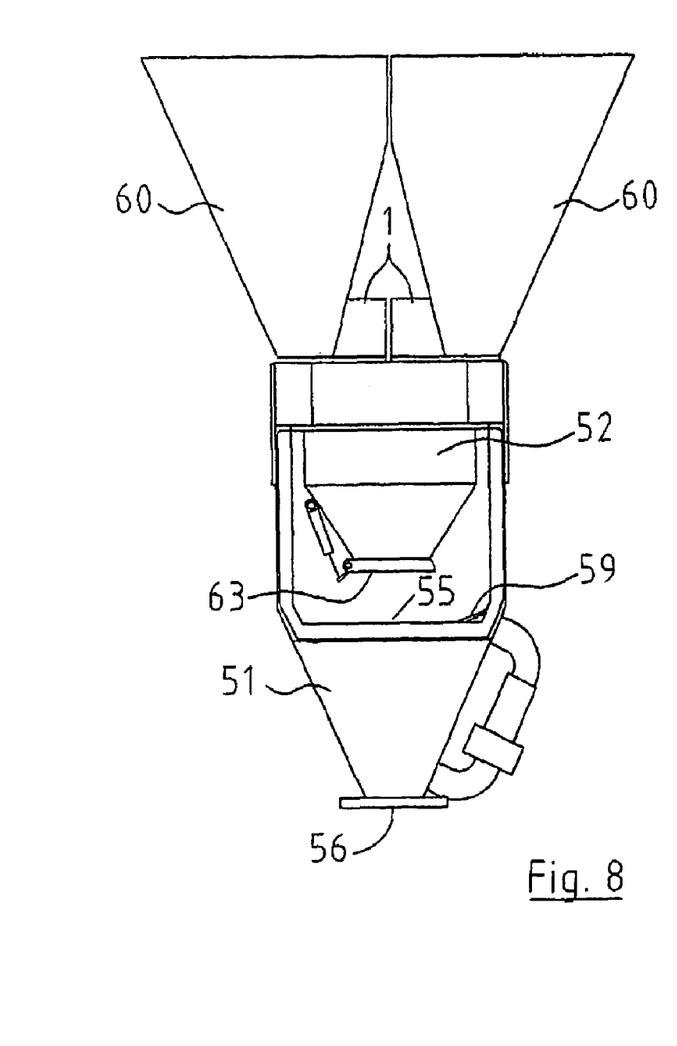
FIG. 8 is a front elevational view of the blender shown in FIG. 6.
Figure 9:
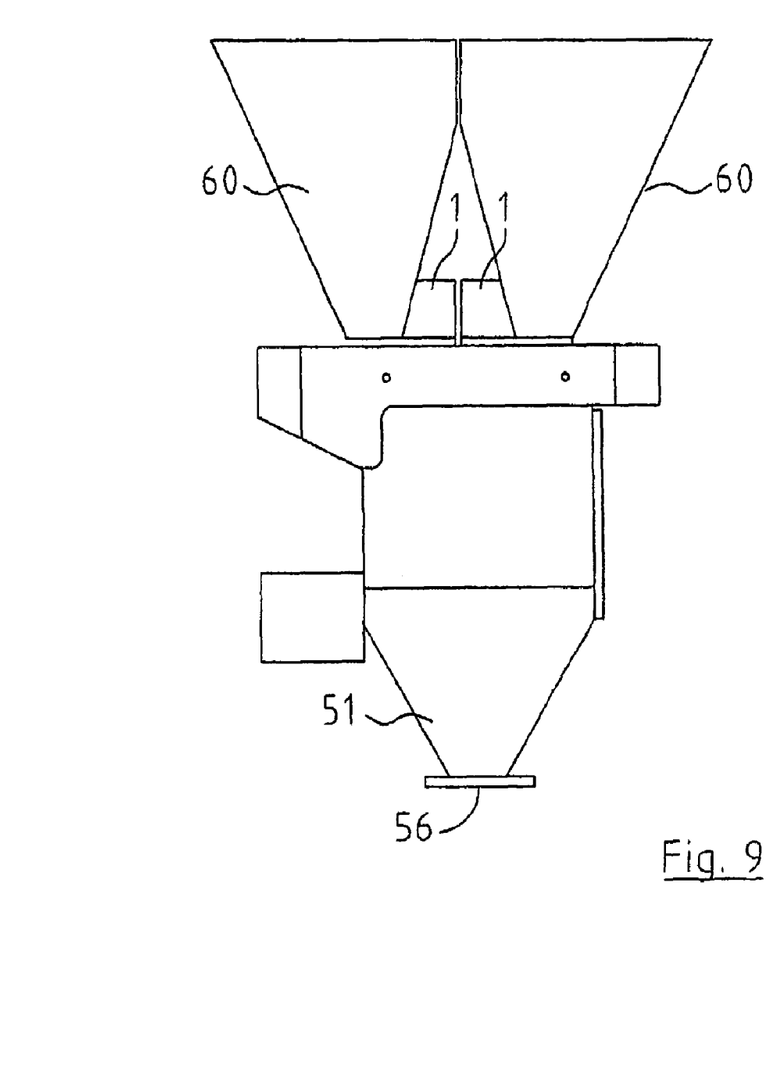
FIG. 9 is a side elevational view of the blender shown in FIG. 6.

Referring to FIG. 5 there is shown another mixing device indicated generally by the reference numeral 40. Parts similar to those described previously are assigned the same reference numerals. In this case the mixing device comprises a mixing chamber 41 having side walls 42 which slope inwardly and downwardly between an upper inlet 43 and a lower outlet 44 of the mixing chamber 41. Thus, material within the mixing chamber 41 is directed downwardly towards a bottom of the mixing chamber 41 at which the outlet 44 is located. It will be noted that in this case a material transfer device 1 is mounted within the mixing chamber 41 with the pipe 2 of the material transfer device 1 being mounted centrally in an upright orientation within the mixing chamber 41. The inlet 4 of the pipe 2 is located adjacent a bottom of the mixing chamber 41 and the outlet end 5 of the pipe 2 is arranged for directing material from the pipe outlet 5 upwardly against an arcuate deflector baffle 45 which is mounted above the pipe outlet 5. Thus material discharged from the pipe outlet 5 is directed outwardly and downwardly by the deflector baffle 45 towards the pipe inlet 4 so that the material within the mixing chamber 41 is moved in a circulatory motion, as indicated by the arrows, for mixing of the material. It will be noted also that new material introduced through the inlet 43 of the mixing chamber 41 is deflected by the baffle 45 outwardly and downwardly against the side walls 41 for movement towards the inlet 4 of the pipe 2 and circulation and mixing with the other material within the mixing chamber 41.

In the mixing devices the pulsing of the gas flow is optional and usually is not required and typically a steady gas stream will be provided.

The material transfer device and/or the mixing devices described previously may be incorporated in blender devices such as those described in our earlier European Patent Application Nos. 96650040.7 (EP0761410) and 98650035.3 (EP0911130), the contents of which are incorporated herein by reference, for example, for controlling delivery of material to or from a weigh hopper and/or for mixing material in a mixing chamber of the blender.

Referring to FIGS. 6 to 9, a blender 50 is shown which includes a mixing chamber 51 above which is mounted a weigh hopper 52. The mixing chamber 51 has four side walls 54 arranged in an inverted pyramid shape so that the side walls 54 slope inwardly and downwardly from an upper inlet 55 towards a lower outlet 56. A mounting flange 57 at the outlet 56 provides means for mounting the blender on a process line or the like. A material transfer device 1 is mounted on one side wall 54 of the mixing chamber 51 with an inlet 4 adjacent a lower end of the side wall 54 for intake of particulate material 58 from a lower end of the mixing chamber 51 and an outlet 5 adjacent an upper end of the side wall 54 for discharge of material 58 against a deflector baffle plate 59 mounted at a top of the mixing chamber 51 and angled downwardly in front of the outlet 5 which directs material downwardly towards the lower end of the mixing chamber 51. Thus, the material 58 can be circulated by the material transfer device 1 for mixing the material 58 within the mixing chamber 51.

The weigh hopper 52 is supplied with material from a number of raw materials supply bins 60 which are mounted above the weigh hopper 52. Raw material is delivered in a controlled manner from each supply bin 60 to the weigh hopper 52 as required by means of material transfer devices 1 located at an outlet of each raw material supply bin 60.

In use, a controller 22 controls operation of the material transfer devices 1 on the bins 60 to deliver desired quantities of raw materials from the raw materials supply bins 60 into the weigh hopper 52 which collects a batch of a number of different raw materials which are to be weighed in a desired ratio. A level sensor 62 mounted on a side wall 54 of the mixing chamber 51, which is also connected to the controller 22, indicates when the mixing chamber 51 is ready to receive a batch of material to be mixed. The controller 22 then operates a discharge flap 63 at an outlet of the weigh hopper 52 by means of a ram 64 to dump the batch of material from the weigh hopper 52 into the mixing chamber 51. The flap 63 is then closed and a new batch of materials can be collected in the weigh hopper 52. The controller 22 also regulates operation of the material transfer device 1 on the mixing chamber 51 for circulation and mixing of the materials 58 within the mixing chamber 51 to ensure a thorough mixing of the material 58 prior to delivery of the mixed material into a production line or the like.

Figure 10:
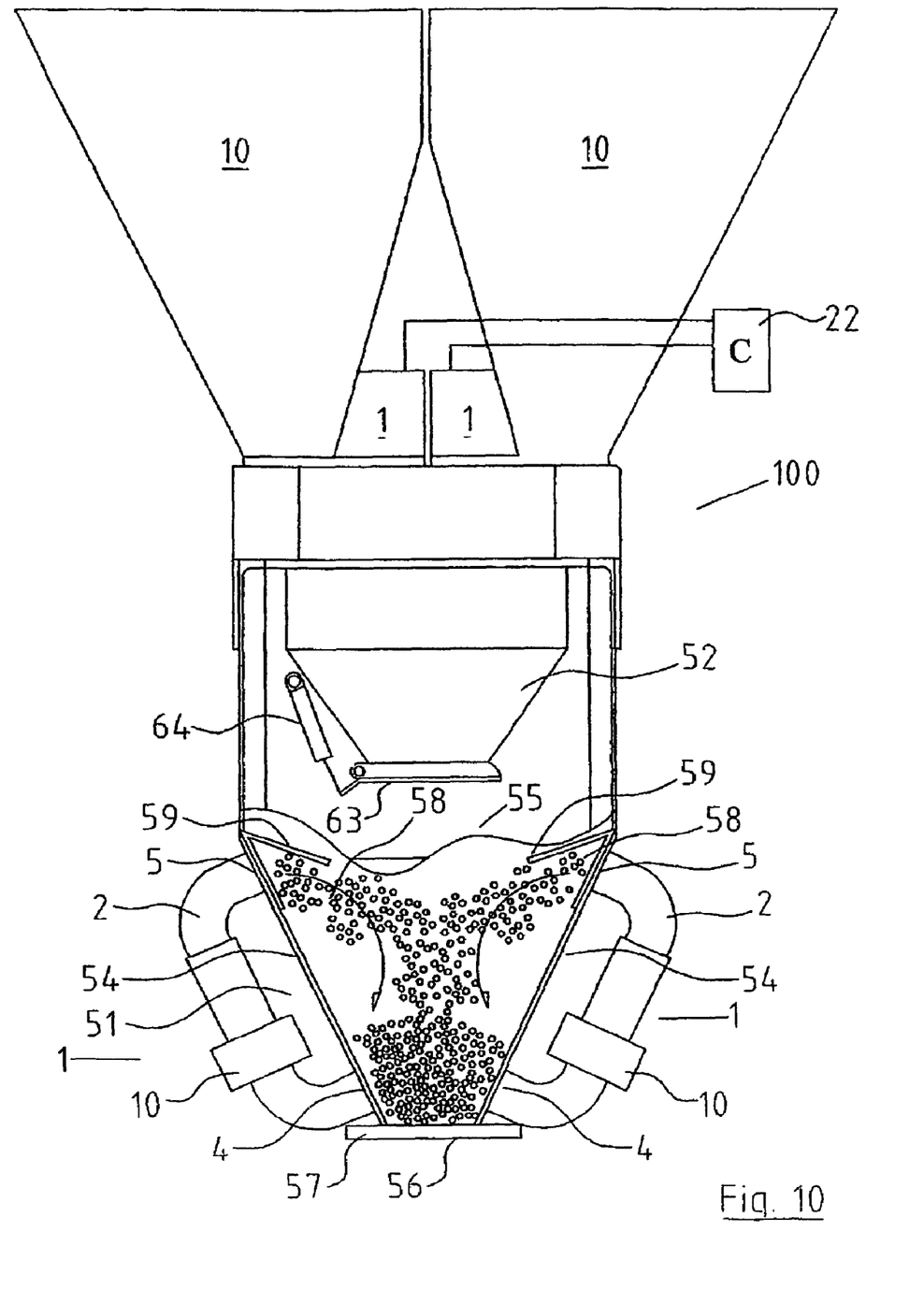
FIG. 10 is a partially cut-away elevational view of another blender incorporating the material transfer device.

Referring now to FIG. 10 there is shown another blender 100 which is largely similar to the blender shown in FIGS. 6 to 9 and like parts are assigned the same reference numerals. In this case two material transfer devices 1 are provided mounted on opposite side walls 54 of the mixing chamber 51. The outlets 5 of the material transfer devices 1 discharge material 58 against deflector baffles 59, streams of material 58 from each of the outlets 5 intermingling as they move downwardly towards the lower end of the mixing chamber 51.

Figure 11:
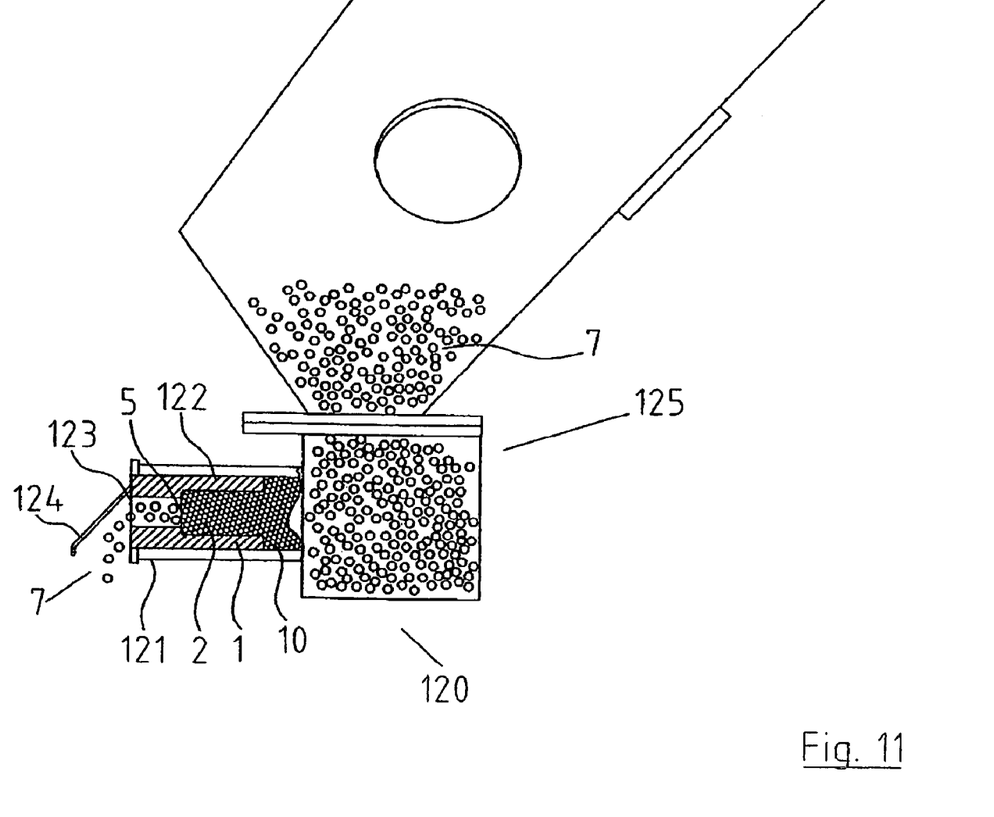
FIG. 11 is a sectional elevational view of a material feeder incorporating the material transfer device.

Referring now to FIG. 11 there is shown a material feeder incorporating a material transfer device of the invention, the material feeder being indicated generally by the reference numeral 120. Parts similar to those described previously are assigned the same reference numerals. A material transfer device 1 is mounted within a housing 121. A stepped tubular sleeve 122 mounted within the housing 121 engages about the pipe 2 and has a discharge bore 123 which receives material from the outlet 5 of the device 1. A deflector plate 124 is mounted at an outlet end of the sleeve 122 to direct material 7 downwardly into a weigh hopper for example. An inlet of the pipe 2 of the device 1 communicates with a material supply bin 125. Operation of the material transfer device 1 delivers particulate material 7 from the supply bin 125 for discharge through the outlet 5. The material feeder 120 may be conveniently incorporated in blender devices of the type described in our earlier European patent application nos. 96650040.7 (EP 0761410) and 98650035.3 (EP 0911130), replacing the screw feeders for delivering particulate material into the additives discharge chute or into the feed or weigh hoppers of these blenders.

The material transfer device of the invention uses a pulsed air stream for the controlled transport of material through a pipe. This effect can be created in a number of ways, some examples of which are described above. Various different ways of delivering the material into the pulsed air stream are also possible.

The material transfer device and system of the invention can conveniently be used in batch blenders generally for the controlled filling or discharge of material from a weigh hopper. The pulse duration of the solenoid controlling the gas inlet valve can be varied to achieve a target material feed weight for each batch of material. The solenoid operated gas inlet valve can be pulsed for varying durations based upon the material dispensed with each pulse and compared to a desired weight. Alternatively gas pressure or flow rate may be varied over a fixed time duration (or continuous) based upon the weight recorded on a load cell mounted hopper or other weighing means.

Blending of two or more materials in any desired ratio over a fixed time period may be achieved by varying the feed rates in each of the material transfer devices used.

It will be appreciated that a volumetric device rather than a weigher may be provided and the material transfer device may be operated according to the measured volume rather than weight of the material being processed.

It is possible to automatically adjust the pulse length controlling the gas inlet valve in response to the weight achieved. By sensing the loss or gain in weight of material in a hopper this can be used to change the pulse duration (and/or gas pressure and/or gas flow) to maintain or change the rate of flow of material either into or out of the hopper as required.

It will be appreciated that the material transfer device may be operated by means of a series of pulses to give a continuous flow rate controlled by the rate or frequency of the pulses and/or gas flow due to change in pressure or volume of the gas.

Instead of using a solenoid to control the gas inlet valve any other suitable controller could be used such as a pneumatic controller.

The material transfer device can also be used to meter the feed rate of powders or liquids.

It is envisaged that the material transfer device may also be used in food dispensing applications as a dispensing machine for dispensing weighed amounts of ingredients for example in building up a pizza or the like food product. Similarly, in the pharmaceutical industry the preparation of mixtures of various components for a particular product may be readily easily controlled by material transfer devices of the invention.

Figure 12:
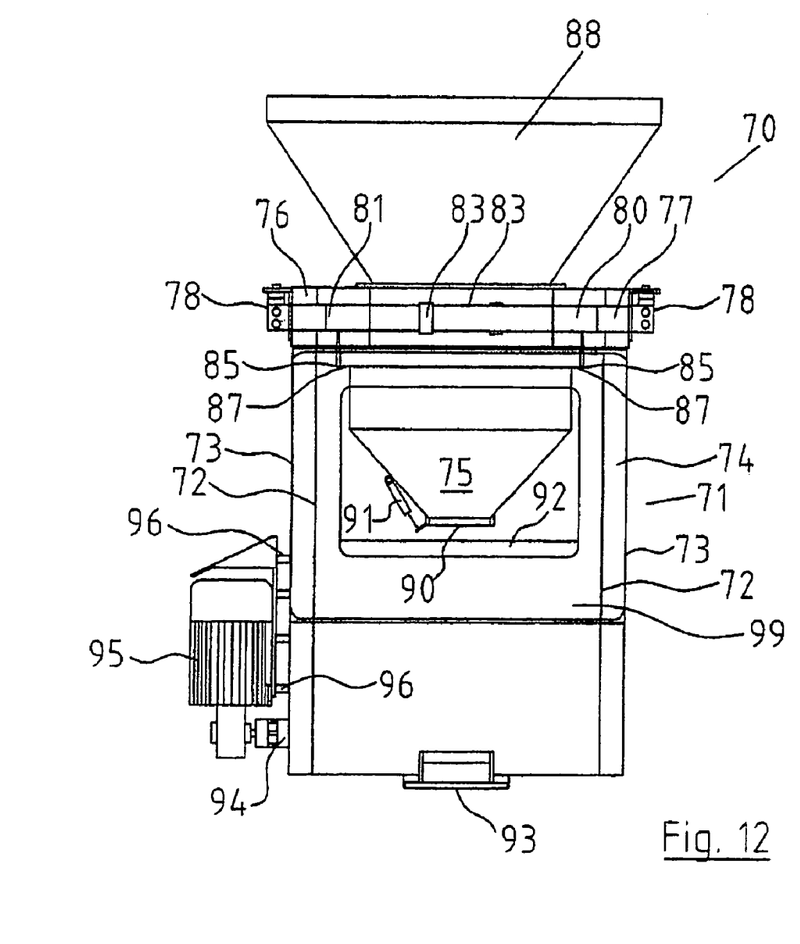
FIG. 12 is a front elevational view of a high temperature blender according to another embodiment of the invention.
Figure 13:
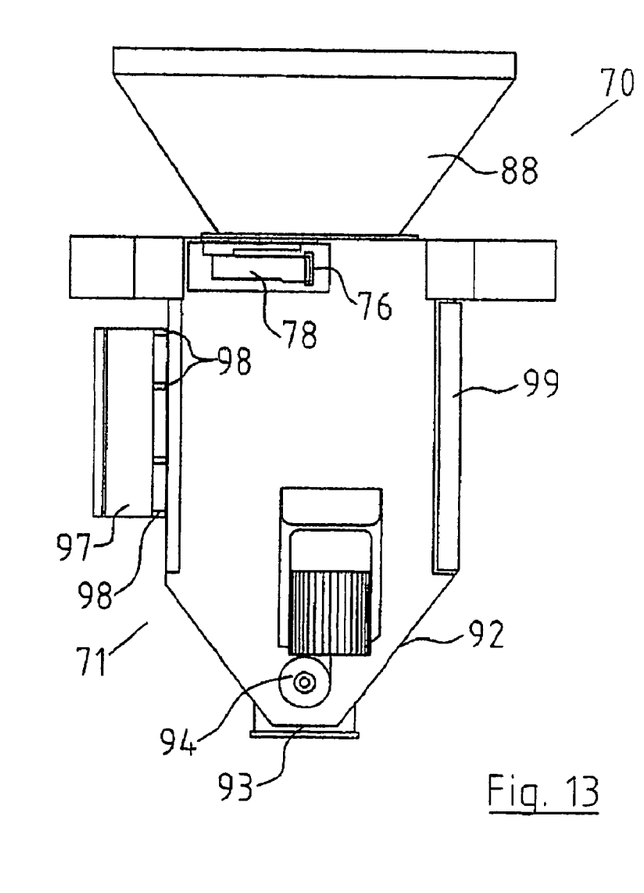
FIG. 13 is a side elevational view of a high temperature blender shown in FIG. 12.

Referring now to FIGS. 12 and 13 there is shown a high temperature blender according to the invention indicated generally by the reference numeral 70. The blender 70 has material handling apparatus mounted within a sealed housing 71 of double wall construction, that is having inner walls 72 (shown in broken outline in FIG. 12) and associated outer walls 73 spaced-apart therefrom leaving an air gap 74 therebetween. Insulation material may be mounted in the air gap 74 if desired.

The material handling apparatus includes a weigh hopper 75 which is suspended within the housing 71 by means of a pair of mutually sliding and overlapping arms 76, 77 each having an outer end attached to a load cell 78 which is mounted outside the housing 71 and a free inner end 80, 81. Collars 83 engage and support the arms 76, 77 and allow them slide longitudinally relative to each other to accommodate thermal expansion. Hangers 85 depend from the inner ends 80, 81 of the arms 76, 77 to support opposite sides of a flanged rim 87 of the weigh hopper 75. As the load cells 78 are mounted outside the housing 71 on an exterior of the housing 71, they are thermally isolated from the interior of the housing 71. A raw material supply bin or chute 88 is mounted above the weigh hopper 75 for controlled delivery of material to the weigh hopper 75. A discharge flap 90 is mounted at a lower outlet end of the weigh hopper 75 and this is operated by a ram 91. Mounted directly below the weigh hopper 75 is a mixing chamber 92 having an open top and an outlet 93 at the lower end of the mixing chamber 92. A mixing screw 94 is located within a trough at a bottom end of the mixing chamber 92 for mixing material within the mixing chamber 92 prior to discharge through the outlet 93. The mixing screw 94 projects outwardly through the double walls of the housing 71 and is coupled to a drive motor 95. It will be noted that the motor 95 is mounted spaced-apart from the housing 71 upon a number of support struts 96. It will be noted also that the portion of the screw 94 which passes through the air gap 74 between the twin walls 72, 73 is provided with fins for heat dissipation to prevent or at least minimise heat travel along the screw 94 to the motor 95. As an alternative to the mixing screw 94 an arrangement of material transfer device 1 on the side wall of the mixing chamber 92—similar to the arrangements shown in FIGS. 6 to 9 or FIG. 10 may be employed for mixing the material in the mixing chamber 92.

It will be noted from FIG. 13 that a control box 97 is also mounted spaced-apart from the housing 71 upon mounting struts 98.

A hinged door 99 with a window is provided at a front of the housing 71 to allow access to an interior of the housing 71. This door 99 is also of twin wall construction having an inner high temperature glass panel and an outer plexiglass exterior panel. A high temperature resilient seal is provided between the inner high temperature glass panel and the periphery of the opening over which the door 99 is mounted.

It will be noted that the housing 71 is sealed to prevent ingress of ambient air which might provide moisture for absorption by the material being processed in the blender 70. It will also be noted that the double skin on the housing provides both insulation and protection against burning if the outside of the housing 71 is accidentally touched when the blender 70 is in use. Typically the material being processed through the blender 70 might have a temperature in the order of 200° C.

In use, materials from supply hoppers 88 are delivered in a desired ratio to the weigh hopper 75. This may be done in any suitable method, for example by using material transfer devices 1 of the type previously described. When the level of the material in the mixing chamber 92 falls to a predetermined level, the weigh hopper 75 dumps a fresh batch of material into the mixing chamber 92 and the mixing screw 94 (or material transfer device) mixes the material within the mixing chamber 92 prior to discharge of the material through the outlet 93 into a processing line or the like.

The invention is not limited to the embodiments hereinbefore described which may be varied in both construction and detail within the scope of the appended claims.

The invention claimed is:

1. A material transfer device, including:
a pipe defining a material delivery path,
the pipe having a material inlet and a material discharge outlet,
means for delivering a gas stream along the material delivery path directed towards the outlet,
control means for controlling the gas stream for controlling delivery of material through the pipe,
said control means being operable for pulsing the gas stream for controlling delivery of material through the pipe in discrete amounts,
said control means being operable to deliver a target quantity of material through the pipe in a pulse,
means for measuring the actual quantity of material delivered through the pipe by said pulse, said measuring means being connected to the control means,
the control means being operable to compare the actual quantity of material delivered by said pulse with the target quantity of material and adjust the next pulse in response to the difference between the measured actual quantity and the target quantity of material to achieve delivery of the target quantity material in the next pulse.

2. The material transfer device as claimed in claim 1 wherein said control means is a gas inlet valve connected to a controller which is operable to open and shut the valve for desired time periods.

3. The material transfer device as claimed in claim 1 wherein the gas control means includes means for regulating the pressure of the gas.

4. The material transfer device as claimed in claim 3 wherein said means comprises a pressure regulator mounted upstream of the gas inlet valve.

5. The material transfer device as claimed in claim 1 wherein the gas control means includes means for regulating gas flow rate.

6. The material transfer device as claimed in claim 1 including means for delivering an annular gas stream into the pipe.

7. The material transfer device as claimed in claim 6 wherein the means for delivering an annular gas stream into the pipe comprises a gas inlet manifold extending about the pipe having an inlet for connection to a pressurized gas supply and an outlet communicating with the material delivery path.

8. The material transfer device as claimed in claim 7, wherein the outlet includes a number of circumferentially spaced-apart outlet openings extending through the pipe and arranged to direct gas towards the outlet of the pipe.

9. The material transfer device as claimed in claim 7 wherein the outlet of the means for delivering the annular gas stream into the pipe is located intermediate the ends of the pipe for delivering the gas stream into the pipe directed towards the outlet of the pipe.

10. The material transfer device as claimed in claim 1 wherein the means for delivering a gas stream along the material delivery path has a gas outlet angled relative to the pipe to direct a gas stream into the pipe towards the outlet of the pipe.

11. The material transfer device as claimed in claim 1 in combination with a weighing device with either the inlet or the outlet of the pipe being connected to an outlet or an inlet respectively of the weighing device.

12. A blending apparatus for controlled delivery of blend additives to a material processing device, including:
a primary additive feed hopper,
at least one secondary additive feed hopper, an additive discharge chute having an outlet for connection to the material processing device, the primary additive feed hopper being mounted above the additive discharge chute for continuous gravity feed of additive material thereto, a secondary feeding means being connected between each secondary feed hopper and the additives discharge chute for delivery of feed additives from the secondary feed hopper to the additives discharge chute, means for sensing the throughput of material in the material processing device, means for sensing the discharge of additives from the feed hoppers, a controller adapted to be connected to the means for sensing the throughput of the material processing device and to the means for sensing the discharge of additives from the feed hoppers, the controller including means for regulating the throughput of material through the material processing device in response to the sensed discharge of material from the feed hoppers, the secondary feeding means comprising a material transfer device including a pipe defining a material delivery path, the pipe having a material inlet and a material discharge outlet, means for delivery of a gas stream along the material delivery path directed towards the outlet to deliver material between the inlet and the outlet, the inlet being connected to the secondary feed hopper and the outlet discharging into the additives discharge chute.

13. A blender, including:

a supply hopper, a weigh hopper for weighing a batch of material, a mixer for reception of material from the weigh hopper and being operable to mix said material prior to delivery of said material into a process line, a material transfer device mounted between the supply hopper and the weigh hopper, said material transfer device having a pipe defining a material delivery path, said pipe having a material inlet connected to the supply hopper and a material discharge outlet connected to an inlet of the weigh hopper, means for delivering a gas stream along the material delivery path directed towards the outlet, control means for controlling the gas stream for controlling delivery of material through the pipe, said control means being operable for pulsing the gas stream for controlling delivery of material through the pipe in discrete amounts, said control means being operable to deliver a target quantity of material through the pipe in a pulse, means for measuring the actual quantity of material delivered through the pipe by said pulse, said measuring means being connected to the control means, the control means being operable to compare the actual quantity of material delivered by said pulse with the target quantity of material and adjust the next pulse in response to the difference between the measured actual quantity and the target quantity of material to achieve deliver of the target quantity material in the next pulse.

14. The blender as claimed in claim 13, wherein the control means is operable to deliver a target weight of material through the pipe in a pulse, a load cell on the weigh hopper for measuring the actual weight of material delivered through the pipe by said pulse to the weigh hopper, said load cell being connected to the control means, the control means being operable to compare the actual weight of material delivered by said pulse with the target weight of material and adjust the next pulse in response to the difference between the measured actual weight and the target weight of material to achieve delivery of the target weight of material to the weigh hopper in the next pulse.

* * * * *